United States Patent
Albright et al.

(10) Patent No.: US 10,040,437 B2
(45) Date of Patent: *Aug. 7, 2018

(54) BRAKE CONTROL UNIT (71) Applicant: Horizon Global Americas Inc., Plymouth, MI (US)

(72) Inventors: Marcia Albright, Coldwater, MI (US); Chandrakumar Kulkarni, Battle Creek, MI (US); Jerald Prater, Tecumseh, MI (US); Jason Reichard, Scotts, MI (US); Dennis Morse, Jackson, MI (US); Mark Austin, Coldwater, MI (US); Pat Burgess, West Point, IN (US); Marvin Hoot, Woodburn, IN (US); Larry Eccleston, Battle Creek, MI (US); Steve Zavodny, Fort Wayne, IN (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,781

(22) Filed: Apr. 13, 2017

(65) Prior Publication Data

US 2017/0217411 A1 Aug. 3, 2017

Related U.S. Application Data (63) Continuation of application No. 14/299,753, filed on Jun. 9, 2014, which is a continuation of application
(Continued)

(51) Int. Cl.
*B60T 7/20* (2006.01)
*B60T 8/32* (2006.01)
(Continued)

(52) U.S. Cl.
CPC .............. *B60T 8/323* (2013.01); *B60T 7/085* (2013.01); *B60T 7/20* (2013.01); *B60T 8/172* (2013.01);
(Continued)

(58) Field of Classification Search
CPC . B60T 8/323; B60T 17/22; B60T 7/20; B60T 8/00
(Continued)

(56) References Cited

U.S. PATENT DOCUMENTS

| | | | |
|---|---|---|---|
| 1,132,294 | A | 3/1915 | Wilkie |
| 2,228,631 | A | 1/1941 | Kuiper |

(Continued)

FOREIGN PATENT DOCUMENTS

| | | |
|---|---|---|
| CA | 2157820 | 3/1996 |
| CA | 2201986 | 10/1997 |

(Continued)

OTHER PUBLICATIONS

Motorola, Motorola Holster—SYN0718, http://commerce.motorola.com/cgi-bin/ncommerce3/ProductDisplay?prrfnbr=230044 &prmenbr=126&accessories_cgrfnbr=22 . . . .
(Continued)

*Primary Examiner* — Anna M Momper
*Assistant Examiner* — Mahbubur Rashid
(74) *Attorney, Agent, or Firm* — McDonald Hopkins LLC (57) ABSTRACT

Towed vehicles can be extremely heavy. Accordingly, it is too much of a burden to the braking system of a towing vehicle to not have brakes on the towed vehicle. Controlling the brakes of the towed vehicle must be accurately applied otherwise undesirable conditions can be created. There is a need for a method for controlling braking of a towed vehicle. This method comprises receiving a first signal via a communication bus of a towing vehicle, the first signal relating
(Continued)

to at least one operating condition of at least one the towing vehicle and a towed vehicle, sending a second signal to brakes of the towed vehicle, the second signal based on said first signal.

26 Claims, 5 Drawing Sheets

Related U.S. Application Data

No. 11/247,690, filed on Oct. 11, 2005, now Pat. No. 8,746,812.

(60) Provisional application No. 60/616,979, filed on Oct. 8, 2004, provisional application No. 60/617,062, filed on Oct. 8, 2004.

(51) Int. Cl.
 *B60T 17/22* (2006.01)
 *B60T 8/88* (2006.01)
 *B60T 8/172* (2006.01)
 *B60T 7/08* (2006.01)

(52) U.S. Cl.
 CPC ............. *B60T 8/885* (2013.01); *B60T 17/22* (2013.01); *B60T 2270/402* (2013.01); *B60T 2270/413* (2013.01)

(58) Field of Classification Search
 USPC .................................................. 303/123, 124
 See application file for complete search history.

(56) References Cited

U.S. PATENT DOCUMENTS

| | | |
|---|---|---|
| 2,870,276 A | 1/1959 | Gelzer |
| 3,015,958 A | 1/1962 | Dove |
| 3,023,626 A | 3/1962 | Bonnell |
| 3,053,348 A | 9/1962 | Stair |
| D199,904 S | 12/1964 | Nunn, Jr. |
| 3,183,512 A | 5/1965 | Castle |
| 3,276,270 A | 10/1966 | Speen |
| 3,354,725 A | 11/1967 | Canfield |
| D215,158 S | 9/1969 | Ozaki |
| 3,497,266 A | 2/1970 | Umpleby |
| 3,501,599 A | 3/1970 | Horecky |
| 3,503,652 A | 3/1970 | Broek |
| 3,519,805 A | 7/1970 | Throne-Booth |
| 3,569,788 A | 3/1971 | Niblack |
| 3,574,414 A | 4/1971 | Jacob |
| 3,598,453 A | 8/1971 | Riordan |
| 3,601,794 A | 8/1971 | Blomenkamp et al. |
| 3,704,670 A | 12/1972 | Dobson et al. |
| 3,710,629 A | 1/1973 | Wojtulewicz |
| 3,730,287 A | 5/1973 | Fletcher et al. |
| 3,738,710 A | 6/1973 | Pokrinchak et al. |
| 3,778,118 A | 12/1973 | Podlewski et al. |
| 3,780,832 A | 12/1973 | Marshall |
| 3,792,250 A | 2/1974 | Kilbourn et al. |
| 3,833,784 A | 9/1974 | Bobel et al. |
| 3,867,844 A | 2/1975 | Shimizu et al. |
| 3,897,979 A | 8/1975 | Vangalis et al. |
| 3,908,782 A | 9/1975 | Lang et al. |
| 3,909,075 A | 9/1975 | Pittet, Jr. et al. |
| 3,953,080 A | 4/1976 | Bremer |
| 3,953,084 A | 4/1976 | Pittet, Jr. et al. |
| 3,955,652 A | 5/1976 | Nilsson et al. |
| 3,964,796 A | 6/1976 | Bremer |
| 3,967,863 A | 7/1976 | Tomecek et al. |
| 3,981,542 A | 9/1976 | Abrams et al. |
| 3,981,544 A | 9/1976 | Tomecek et al. |
| 3,993,362 A | 11/1976 | Kamins et al. |
| 4,030,756 A | 6/1977 | Eden |
| 4,042,810 A | 8/1977 | Mosher |
| 4,043,608 A | 8/1977 | Bourg et al. |
| 4,050,550 A | 9/1977 | Grossner et al. |
| 4,061,407 A | 12/1977 | Snow |
| 4,072,381 A | 2/1978 | Burkhart et al. |
| 4,076,327 A | 2/1978 | Hubbard |
| 4,079,804 A | 3/1978 | Paillard |
| 4,084,859 A | 4/1978 | Bull et al. |
| 4,108,006 A | 8/1978 | Walter |
| 4,122,434 A | 10/1978 | Jensen |
| 4,128,745 A | 12/1978 | Marsilio et al. |
| 4,161,649 A | 7/1979 | Klos et al. |
| 4,196,936 A | 4/1980 | Snyder |
| D257,972 S | 1/1981 | Freehauf et al. |
| D257,973 S | 1/1981 | Reid |
| 4,277,895 A | 7/1981 | Wiklund |
| 4,295,687 A | 10/1981 | Becker et al. |
| 4,316,067 A | 2/1982 | Whiteman, Jr. |
| 4,336,592 A | 6/1982 | Beck |
| D266,501 S | 10/1982 | Stefanik |
| 4,370,714 A * | 1/1983 | Rettich ............... B60T 8/00 303/20 |
| 4,386,427 A | 5/1983 | Hosaka |
| 4,398,252 A | 8/1983 | Frait |
| 4,402,047 A | 8/1983 | Newton et al. |
| 4,404,619 A | 9/1983 | Ferguson |
| 4,414,848 A | 11/1983 | Shutt |
| 4,419,654 A | 12/1983 | Funk |
| 4,445,376 A | 5/1984 | Merhav |
| D275,973 S | 10/1984 | Marino |
| 4,550,372 A | 10/1985 | Kahrs |
| 4,586,138 A | 4/1986 | Mullenhoff et al. |
| 4,587,655 A | 5/1986 | Hirao et al. |
| 4,624,506 A | 11/1986 | Doto |
| 4,660,418 A | 4/1987 | Greenwood et al. |
| 4,665,490 A | 5/1987 | Masaki et al. |
| 4,681,991 A | 7/1987 | Anderson |
| 4,721,344 A | 1/1988 | Frait et al. |
| 4,722,576 A | 2/1988 | Matsuda |
| 4,726,627 A | 2/1988 | Frait et al. |
| 4,768,840 A | 9/1988 | Sullivan et al. |
| 4,836,616 A | 6/1989 | Roper et al. |
| 4,845,464 A | 7/1989 | Drori et al. |
| 4,849,655 A | 7/1989 | Bennett |
| 4,850,656 A | 7/1989 | Ise et al. |
| 4,852,950 A | 8/1989 | Murakami |
| 4,856,850 A | 8/1989 | Aichele et al. |
| 4,872,099 A | 10/1989 | Kelley et al. |
| 4,905,518 A | 3/1990 | Kubler |
| 4,928,084 A | 5/1990 | Reiser |
| D308,666 S | 6/1990 | Oesterheld et al. |
| D315,216 S | 3/1991 | Kelley et al. |
| 5,002,343 A | 3/1991 | Brearley et al. |
| D316,399 S | 4/1991 | Wharton |
| 5,016,898 A | 5/1991 | Works et al. |
| 5,032,821 A | 7/1991 | Domanico et al. |
| D319,423 S | 8/1991 | Karczewski et al. |
| 5,044,697 A | 9/1991 | Longyear et al. |
| 5,050,937 A | 9/1991 | Eccleston |
| 5,050,938 A * | 9/1991 | Brearley ............... B60T 8/1887 303/20 |
| 5,050,940 A | 9/1991 | Bedford et al. |
| 5,058,960 A | 10/1991 | Eccleston et al. |
| D322,426 S | 12/1991 | Austin |
| D323,136 S | 1/1992 | Chase et al. |
| 5,080,445 A | 1/1992 | Brearley et al. |
| D326,926 S | 6/1992 | Stephenson et al. |
| 5,139,315 A | 8/1992 | Walenty et al. |
| 5,142,473 A | 8/1992 | Davis |
| 5,149,176 A | 9/1992 | Eccleston |
| D331,226 S | 11/1992 | Austin |
| D334,733 S | 4/1993 | Morgan et al. |
| 5,226,700 A | 7/1993 | Dyer |
| 5,242,215 A | 9/1993 | Krause |
| 5,255,962 A | 10/1993 | Neuhaus et al. |
| 5,322,255 A | 6/1994 | Garrett |
| 5,333,948 A | 8/1994 | Austin et al. |
| D351,141 S | 10/1994 | Van Akkeren et al. |
| 5,352,028 A | 10/1994 | Eccleston |
| 5,355,717 A | 10/1994 | Tanaka et al. |

(56) References Cited

U.S. PATENT DOCUMENTS

| | | |
|---|---|---|
| 5,389,823 A | 2/1995 | Hopkins et al. |
| D365,298 S | 3/1995 | Austin |
| 5,398,901 A | 3/1995 | Brodmann et al. |
| 5,423,601 A | 6/1995 | Sigl |
| 5,446,657 A | 8/1995 | Ikeda et al. |
| D362,659 S | 9/1995 | Redding et al. |
| D363,999 S | 11/1995 | Taylor et al. |
| 5,487,305 A | 1/1996 | Ristic et al. |
| 5,487,598 A | 1/1996 | Rivard et al. |
| 5,498,910 A | 3/1996 | Hopkins et al. |
| D369,224 S | 4/1996 | Karlo et al. |
| 5,510,989 A | 4/1996 | Zabler et al. |
| D370,448 S | 6/1996 | McCoy et al. |
| 5,549,362 A * | 8/1996 | Broome .............. B60T 8/00 303/123 |
| 5,549,364 A | 8/1996 | Mayr-Frohlich et al. |
| 5,571,023 A | 11/1996 | Anthony |
| 5,575,543 A | 11/1996 | Pheonix |
| D376,437 S | 12/1996 | Karlo et al. |
| D376,576 S | 12/1996 | Pratt |
| 5,581,034 A | 12/1996 | Dao et al. |
| 5,587,865 A | 12/1996 | Bielig et al. |
| 5,606,308 A | 2/1997 | Pinkowski |
| D378,511 S | 3/1997 | Austin |
| 5,615,930 A | 4/1997 | McGrath et al. |
| 5,620,236 A | 4/1997 | McGrath et al. |
| 5,648,755 A | 7/1997 | Yagihashi |
| 5,649,749 A | 7/1997 | Kullmann et al. |
| D388,523 S | 12/1997 | Austin |
| 5,700,068 A | 12/1997 | Austin |
| 5,706,909 A | 1/1998 | Bevins et al. |
| 5,719,333 A | 2/1998 | Hosoi et al. |
| D392,604 S | 3/1998 | Wright et al. |
| 5,738,363 A | 4/1998 | Larkin |
| 5,741,048 A | 4/1998 | Eccleston |
| D394,626 S | 5/1998 | Sacco et al. |
| 5,782,542 A | 7/1998 | McGrath et al. |
| 5,785,393 A | 7/1998 | McGrath et al. |
| 5,800,025 A | 9/1998 | McGrath et al. |
| D399,187 S | 10/1998 | Kay |
| 5,832,840 A | 11/1998 | Woof |
| D404,365 S | 1/1999 | Robertson et al. |
| 5,890,084 A | 3/1999 | Halasz et al. |
| D407,694 S | 4/1999 | Hill et al. |
| D408,773 S | 4/1999 | Blanchard |
| 5,893,575 A | 4/1999 | Larkin |
| D411,829 S | 7/1999 | Pancheri et al. |
| 5,949,147 A | 9/1999 | McGrath et al. |
| 5,951,122 A | 9/1999 | Murphy |
| D418,098 S | 12/1999 | Wallace |
| D418,822 S | 1/2000 | Worley et al. |
| 6,012,780 A | 1/2000 | Duvernay |
| 6,039,410 A | 3/2000 | Robertson et al. |
| 6,052,644 A | 4/2000 | Murakami et al. |
| 6,068,352 A | 5/2000 | Kulkarni et al. |
| 6,100,943 A | 8/2000 | Koide et al. |
| 6,122,568 A | 9/2000 | Madau et al. |
| 6,126,246 A | 10/2000 | Decker, Sr. et al. |
| 6,131,457 A | 10/2000 | Sato |
| D433,387 S | 11/2000 | Roth et al. |
| D434,011 S | 11/2000 | Roth et al. |
| D434,391 S | 11/2000 | Roth et al. |
| D434,392 S | 11/2000 | Reichard |
| D435,494 S | 12/2000 | Reichard |
| D436,932 S | 1/2001 | Roth et al. |
| 6,175,108 B1 | 1/2001 | Jones et al. |
| 6,177,865 B1 | 1/2001 | Bryant et al. |
| 6,179,390 B1 | 1/2001 | Guzorek et al. |
| 6,201,284 B1 | 3/2001 | Hirata et al. |
| 6,232,722 B1 | 5/2001 | Bryant et al. |
| 6,234,584 B1 | 5/2001 | Stumpe et al. |
| 6,263,733 B1 | 7/2001 | Reimer et al. |
| 6,273,522 B1 | 8/2001 | Feetenby et al. |
| 6,282,480 B1 | 8/2001 | Morse et al. |
| 6,286,911 B1 | 9/2001 | Wright et al. |
| 6,299,102 B2 | 10/2001 | Happ |
| 6,308,134 B1 | 10/2001 | Croyle et al. |
| D450,661 S | 11/2001 | Weisz et al. |
| D451,611 S | 12/2001 | Pontarolo |
| 6,325,466 B1 | 12/2001 | Robertson et al. |
| 6,364,432 B1 | 4/2002 | Mixon |
| 6,367,588 B1 | 4/2002 | Robertson et al. |
| 6,371,572 B1 | 4/2002 | Frank |
| 6,405,592 B1 | 6/2002 | Murari et al. |
| 6,419,055 B1 | 7/2002 | Walsh et al. |
| 6,445,993 B1 | 9/2002 | Eccleston et al. |
| 6,466,821 B1 | 10/2002 | Pianca et al. |
| 6,499,814 B1 | 12/2002 | Mixon |
| D468,273 S | 1/2003 | Reichard |
| D468,704 S | 1/2003 | Reichard |
| D468,705 S | 1/2003 | Reichard |
| 6,516,925 B1 | 2/2003 | Napier et al. |
| 6,520,528 B2 | 2/2003 | Fandrich et al. |
| 6,532,419 B1 | 3/2003 | Begin et al. |
| 6,557,952 B1 | 5/2003 | Robertson et al. |
| D477,553 S | 7/2003 | Brock et al. |
| 6,609,766 B1 | 8/2003 | Chesnut |
| 6,615,125 B2 | 9/2003 | Eccleston et al. |
| 6,619,759 B2 | 9/2003 | Bradsen et al. |
| 6,626,504 B2 | 9/2003 | Harner et al. |
| 6,634,466 B1 | 10/2003 | Brock et al. |
| 6,652,038 B1 | 11/2003 | Frye |
| 6,652,039 B1 * | 11/2003 | Shull ................ B60T 8/404 303/113.2 |
| 6,655,752 B2 | 12/2003 | Robertson et al. |
| 6,666,527 B2 | 12/2003 | Gill et al. |
| 6,668,225 B2 | 12/2003 | Oh et al. |
| 6,685,281 B2 | 2/2004 | MacGregor et al. |
| D488,370 S | 4/2004 | Sivertsen |
| D490,349 S | 5/2004 | Brock et al. |
| 6,752,474 B1 | 6/2004 | Olberding et al. |
| D494,547 S | 8/2004 | Smith et al. |
| 6,802,572 B2 | 10/2004 | Lamke et al. |
| 6,802,725 B2 | 10/2004 | Rowland et al. |
| D498,190 S | 11/2004 | Brock et al. |
| 6,837,551 B2 | 1/2005 | Robinson et al. |
| 6,845,851 B1 | 1/2005 | Donaldson et al. |
| 6,849,910 B2 | 2/2005 | Oberhardt et al. |
| 6,891,468 B2 | 5/2005 | Koenigsberg et al. |
| 6,918,466 B1 | 7/2005 | Decker, Jr. et al. |
| D509,959 S | 9/2005 | Nykoluk |
| 6,966,613 B2 | 11/2005 | Davis |
| D513,171 S | 12/2005 | Richardson |
| 7,021,723 B1 | 4/2006 | Kaufman |
| D522,041 S | 5/2006 | Sewell |
| D523,803 S | 6/2006 | Smith et al. |
| 7,058,499 B2 | 6/2006 | Kissel |
| D527,710 S | 9/2006 | Smith et al. |
| 7,168,531 B2 | 1/2007 | Navarro |
| 7,204,564 B2 | 4/2007 | Brown et al. |
| D542,745 S | 5/2007 | Barnes, Jr. et al. |
| D551,139 S | 9/2007 | Barnes et al. |
| 7,273,260 B2 | 9/2007 | Gray |
| 7,311,364 B2 | 12/2007 | Robertson |
| 7,347,507 B1 | 3/2008 | Stillinger |
| D581,356 S | 11/2008 | Ahlgren |
| D584,695 S | 1/2009 | Hilsbos et al. |
| D593,507 S | 6/2009 | Svoboda et al. |
| D598,395 S | 8/2009 | Hilsbos et al. |
| 7,575,286 B2 | 8/2009 | Robertson |
| D603,808 S | 11/2009 | Svoboda et al. |
| D619,542 S | 7/2010 | Svoboda et al. |
| 8,145,402 B2 | 3/2012 | Craig |
| 8,165,768 B2 | 4/2012 | Leschuk et al. |
| 8,180,546 B2 | 5/2012 | Culbert et al. |
| 8,430,458 B2 | 4/2013 | Kaminski et al. |
| 8,442,797 B2 | 5/2013 | Kim et al. |
| 8,651,585 B2 | 2/2014 | Kaminski et al. |
| 8,700,285 B2 | 4/2014 | Barlsen et al. |
| 8,746,812 B2 | 6/2014 | Albright et al. |
| 8,789,896 B2 | 7/2014 | Albright et al. |
| 2001/0038239 A1 | 11/2001 | Ehrlich et al. |
| 2002/0003571 A1 | 1/2002 | Schofield et al. |
| 2002/0038974 A1 | 4/2002 | Lamke et al. |

(56) References Cited

U.S. PATENT DOCUMENTS

| | | |
|---|---|---|
| 2002/0047684 A1 | 4/2002 | Robertson et al. |
| 2002/0082750 A1 | 6/2002 | Lamke et al. |
| 2002/0095251 A1 | 7/2002 | Oh et al. |
| 2002/0123837 A1 | 9/2002 | Eccleston et al. |
| 2002/0180257 A1 | 12/2002 | Gill et al. |
| 2003/0025597 A1 | 2/2003 | Schofield |
| 2003/0038534 A1 | 2/2003 | Barnett |
| 2003/0042792 A1 | 3/2003 | Reinold et al. |
| 2003/0098610 A1 | 5/2003 | Bradsen et al. |
| 2003/0168908 A1 | 9/2003 | Robinson et al. |
| 2004/0026987 A1 | 2/2004 | Davis |
| 2004/0174141 A1 | 9/2004 | Luz et al. |
| 2004/0245849 A1 | 12/2004 | Kissel |
| 2005/0035652 A1 | 2/2005 | Roll et al. |
| 2005/0077780 A1 | 4/2005 | Robertson |
| 2005/0127747 A1 | 6/2005 | Robertson |
| 2006/0076827 A1 | 4/2006 | Albright et al. |
| 2006/0176166 A1 | 8/2006 | Smith et al. |
| 2006/0214506 A1 | 9/2006 | Albright et al. |
| 2007/0024107 A1 | 2/2007 | Marsden et al. |
| 2007/0114836 A1 | 5/2007 | Kaminski et al. |
| 2007/0222283 A1 | 9/2007 | Skinner et al. |
| 2008/0309156 A1 | 12/2008 | Kissel |
| 2010/0152920 A1 | 6/2010 | McCann |
| 2010/0152989 A1 | 6/2010 | Smith et al. |
| 2010/0222979 A1 | 9/2010 | Culbert et al. |
| 2014/0103619 A1 | 4/2014 | Motts et al. |

FOREIGN PATENT DOCUMENTS

| | | |
|---|---|---|
| CA | 2324091 | 4/2001 |
| CA | 109867 | 8/2006 |
| EP | 0334412 | 9/1989 |
| WO | WO97/07003 | 2/1997 |

OTHER PUBLICATIONS

Service Manual 440-1002 for Carlisle Electric Brake Actuator Kit, Carlisle Industrial Brake and Friction, pp. 1-8.

Electronic Brake Control for 2, 4, 6 and 8 brake applications manual, 2007, Cequent Electrical Products, 9 pgs.

Hayes Lemmerz—Energize III—Brake Controller, http://aftermarket.hayes-lemmerz.com/html/energize_iii.html.

Hayes Lemmerz—Endeavor—Brake Controller, http://aftermarket.hayes-lemmerz.com/html/endeavor.html.

Hayes Lemmerz—Energize XPC—Brake Controller, http://.aftermarket.hayes-lemmerz.com/html/energize_xpc.html.

Dexter Axle—Predator DX2 Controller (058-008-00)—Brake Controller, http://www.dexteraxle.com/inc/pdetail?v=1&pid=1759.

Tekonsha—AccuPower AccuTrac Inertia Brake Control, 1 to 2 Axle Brake System, Model #80510, http://www.tekonsha.com/accuarac.html.

Tekonsha—AccuPower AccuPower DigiTrac II Inertia Brake Control, 1 to 4 Axle Brake Systems, Model #80750, http://www.tekonsha.com/digitrac.html.

Tekonsha—Voyager, Proporational Brake Control, 1 to 4 Axle Brake Systems, Model #9030, http://www.tekonsha.com/tevoyagerintro.html.

Sample of Applicant's products, http://www.hiddenhitch.com/Products/DisplayAccessory.asp?AccessoryID=39503; and 39510.

Sample of Applicant's products, http://www.hiddenhitch.com/Products/DisplayAccessory.asp?AccessoryID=39517; and 39514.

\* cited by examiner

BRAKE CONTROL UNIT

CROSS-REFERENCE TO RELATED APPLICATIONS

This application is a continuation of U.S. patent application Ser. No. 14/299,753, filed on Jun. 9, 2014, entitled "Brake Control Unit," which is a continuation of U.S. patent application Ser. No. 11/247,690 filed on Oct. 11, 2005 and entitled "BRAKE CONTROL UNIT," now U.S. Pat. No. 8,746,812, which claims priority from U.S. Provisional Patent Application No. 60/617,062 filed on Oct. 8, 2004, and U.S. Provisional Patent Application No. 60/616,979 filed on Oct. 8, 2004, which are all hereby incorporated by reference.

FIELD OF THE INVENTION

The present invention relates generally to a brake control unit, and more specifically, to a brake control unit that provides a brake output signal to brakes of a towed vehicle based on certain inputs received.

BACKGROUND OF THE INVENTION

A variety of prior art brake control units that provide a brake output signal to the brakes of a towed vehicle have been proposed and/or manufactured. Few, if any, of these brake control units, however, use speed inputs to provide the brake output signal. They are mostly inertia or pressure based units. Additionally, most current brake control units do not efficiently operate in conjunction with a towing vehicles anti-lock brake system to create a stable braking event.

On most brake control units if the main input is unavailable, the brake control unit will not function properly. Similarly, if a short occurs in most current control brake units, the unit will either disable itself or will shut down, further causing a potentially undesirable situation. And, if a reverse voltage is applied to most brake control units, they will be disabled. Finally, if an error occurs in the brake control unit or between the communication of the brake control unit and the towing vehicle, most systems do not have a way of notifying the operator independent of the brake control unit or storing the error for a technician's review thereof.

Most current brake control units are not integral with the towing vehicle's instrument panel. They are aftermarket units. They are not able to communicate with and communicate over existing systems within the towing vehicle. For example, these units are not able to warn an operator of an error through the towing vehicle's current warning systems. They are unable to operate with the rest of the displays on the towing vehicle's instrument panel.

Finally, most current brake control units are not effectively configurable or completely operable with a particular towing vehicle. The brake control units are unable to be configured to respond to the idiosyncrasies of a particular vehicle, they are unable to provide diagnostic data, they are unable to adjust to conditions in the environment or in the towing vehicle, and are unable to provide life-cycle data regarding the brake control unit.

SUMMARY OF THE INVENTION

What is needed is a brake control unit that generates an output signal to the brakes of a towed vehicle directly related to a variety of input signals sent from the towing vehicle, the towed vehicle, the operator, or a combination of any of the three. Additionally, it would be helpful if such brake control unit stores diagnostic code information and other events that will assist a service technician in diagnosing failure modes in the brake control unit or other modules with which it interfaces. Finally, it would be helpful if brake control unit includes several safety features and redundant procedures built in it to protect against failures in the brake control unit, the towed vehicle, or the towing vehicle.

An embodiment of the present invention is directed to a method for controlling braking of a towed vehicle. The method comprises receiving a first signal via a communication bus of a towing vehicle, the first signal relating to at least one operating condition of at least one the towing vehicle and a towed vehicle, sending a second signal to brakes of the towed vehicle, the second signal based on said first signal.

According to another embodiment of the present invention, a method for controlling braking of a towed vehicle comprises receiving a first signal relating to at least one of an operating condition of a towing vehicle, a manual input, and an operating condition of a towed vehicle, the first signal being received via a communication bus of the towing vehicle, sending a second signal to brakes of the towed vehicle, the second signal based on the first signal, and sending a third signal to the towing vehicle via the communication bus, the third signal relating to the operating condition of at least one of the towing vehicle and the towed vehicle, and storing the third signal in a memory for diagnostic or life cycle management of a brake control unit.

According to yet another embodiment of the present invention, a brake control unit comprises a processor, a first signal relating to at least one of an operating condition of a towing vehicle, a manual input, and an operating condition of a towed vehicle, the first signal sent to the processor via a communication bus of the towing vehicle, and a second signal sent by the processor to brakes of the towed vehicle, the second signal based on the first signal.

According to another embodiment, a brake control unit comprises a first signal from a towing vehicle's communication bus, the first signal relating to at least one operating condition of the towing vehicle or the towed vehicle, a processor capable of receiving the first signal, a second signal sent from said processor to brakes of a towed vehicle, the second signal based on said first signal, a third signal sent to said towing vehicle from the processor, the third signal based on a failure of at least one of the towing vehicle, the towed vehicle, and the brake control unit, and memory operably coupled to the processor to store the third signal.

According to yet another embodiment, a method for controlling braking of a towed vehicle comprises receiving a first signal via a communication bus of a towing vehicle, the first signal relating to anti-lock brakes of the towing vehicle, sending a second signal to brakes of the towed vehicle, the second signal based on the first signal releasing the brakes to prevent wheels of the towed vehicle from locking; and reapplying the brakes of the towed vehicle based on the first signal.

These and other features, advantages and objects of the present invention will be further understood and appreciated by those skilled in the art by reference to the following specification, claims, and appended drawings.

DESCRIPTION OF THE DRAWINGS

Objects and advantages together with the operation of the invention may be better understood by reference to the following detailed description taken in connection with the following illustrations, wherein.

DETAILED DESCRIPTION

A brake control unit for a towed vehicle, e.g., a trailer, disclosed herein generates an output signal to the brakes of the towed vehicle to apply a certain brake load thereto. The output signal is related to a variety of input signals received by the brake control unit from the towing vehicle, the towed vehicle, the operator, or any combination of the three. Additionally, the brake control unit has the capability of storing diagnostic information and other events, including error events, in memory in the brake control unit. This information can assist a service technician in diagnosing failure modes in the brake control unit or other modules such as those of the towing vehicle and/or towed vehicle with which it interfaces. Further, the brake control unit has several safety/performance features and redundant procedures built in to it to protect against failures in the brake control unit, the towed vehicle, and/or the towing vehicle. Finally, the brake control unit drives the towed vehicle's and towing vehicle's brake lamps directly during a manual override braking event. The power to drive the brake lamps comes from a separately fused supply where other brake control units use a single supply for all functions.

The present brake control unit can be an original equipment manufactured (OEM) unit that is installed in the towing vehicle at the factory. Alternatively, the trailer brake control unit can be incorporated into the towing vehicle as an after-market component. The brake control unit can be installed in the dashboard of the towing vehicle, much like a car radio is. In either embodiment, the trailer brake control unit is integrated with the towing vehicle as an electronic control device that provides variable braking power to electric brakes on a vehicle towed by the towing vehicle.

More specifically, the brake control unit generates and applies a particular voltage to the brakes of the towed vehicle so as to apply a brake load to slow-down or stop the towed vehicle. The voltage applied is related to the input signals available on and/or from the towing vehicle, among other available inputs. Several of these input signals are diagrammatically represented on FIG. 2. It should be understood, however, that the brake control unit can have other input signals inputted therein leading to other responsive outputs applied thereto. These additional input signals may come directly from the operator of the towing vehicle, from the towed vehicle, or a combination of any of the three.

The brake control unit uses a variety of preselected or continuously modified algorithms to generate the appropriate output to the towed vehicle brakes based on the received inputs. A processor on the towing vehicle (although it may be located on the towed vehicle) receives the input signals from the source (such as the ABS system, a speed meter, the ignition, the brake pedal, other processors on the towing vehicle, etc.) and generates the appropriate output signal. The algorithms stored within the processor may be updated by having new algorithms entered therein or having the existing algorithms modified automatically or manually. It should be noted that the brake control unit is capable of being reprogrammed meaning that the algorithms stored therein can be modified by a technician or a completely new set of algorithms may be entered therein by a technician. This allows the brake control unit to be updated with new information regarding the towing vehicle, the towed vehicle, or the brake control unit itself. The algorithms stored in the brake control unit correspond to each unique combination of inputs. The selection of the appropriate algorithm or algorithms is done by the processor once it receives the appropriate input information. Further, depending upon changes in the input(s), the processor may select a different algorithm or algorithms to generate the appropriate brake output signal. Of course, the processor or a technician/operator may alter the algorithms stored to generate an appropriate brake output signal.

The braking energy provided to the trailer is varied with a pulse width modulated (PWM) signal that switches between zero volts and the available battery voltage. The higher the duty cycle (more time spent at the available battery voltage), the more braking power available. Algorithm(s) controlled by the brake control unit determines the brake output signal, for example the PWM output signal, to the towed vehicle brakes based on information it receives from the towing vehicle, towed vehicle, and/or directly from operator selected settings captured via the brake control unit, including those captured via the brake control unit's faceplate display. (The faceplate display is accessible to the operator by its position in the towing vehicle's instrument panel, which is discussed in more detail below.)

The brake output signal controlled by the brake control unit based on information it receives can be represented as a transfer function. This transfer function relating the brake output signal to the various input signals can be defined as, for example, by: PWM %=f1(BPT−BPToffset)*f2(vehicle states from ABS)*f3(gain)*f4(voltage)*f5(brakes-on-off)*f6(manual override)*f7(redundant brake signal)*f8 (time). It should be understood, however, that the transfer function can include any or all of the input signals listed above in any manner or combination. Additionally, it should be understood that the transfer function is not limited to those input signals listed above.

Figure 1A:
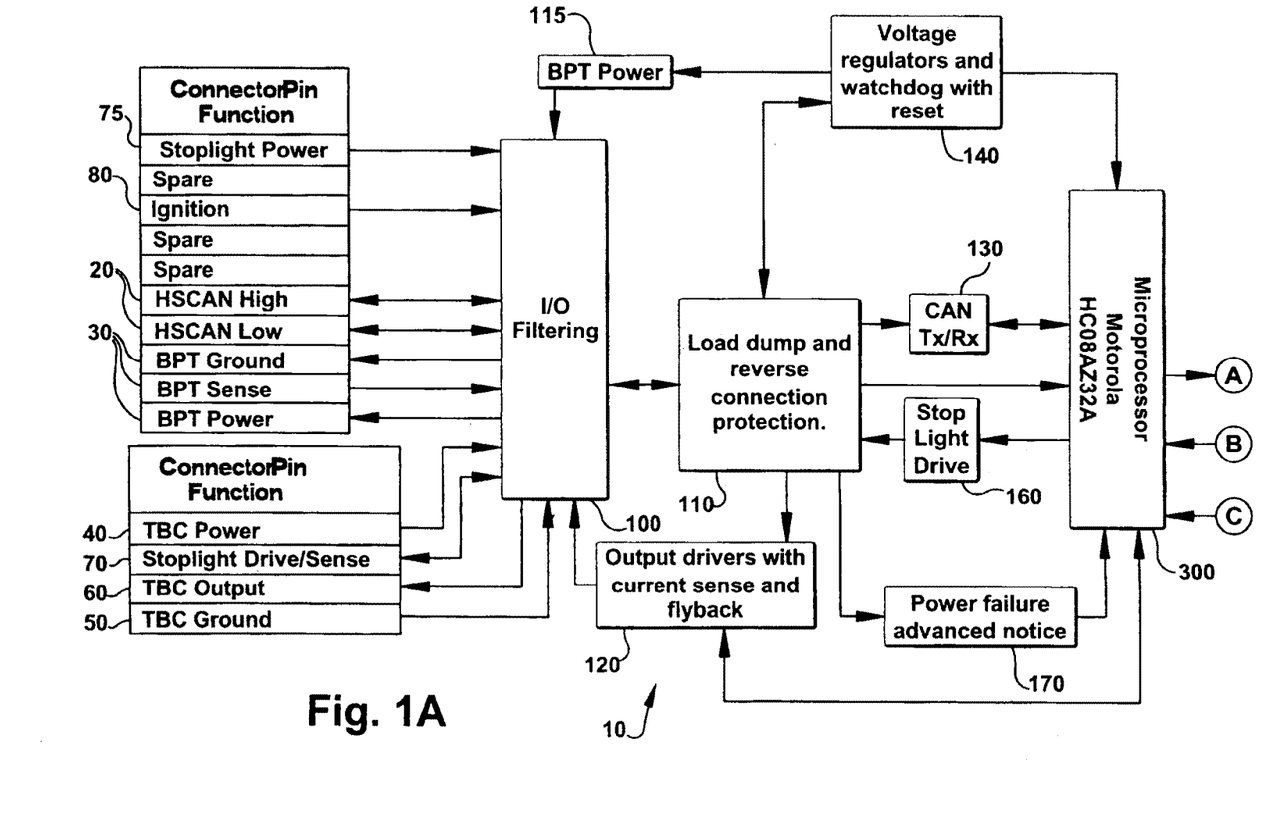
FIG. 1A is an exemplary electrical block diagram of a brake control unit, according to an embodiment of the present invention.
Figure 1B:
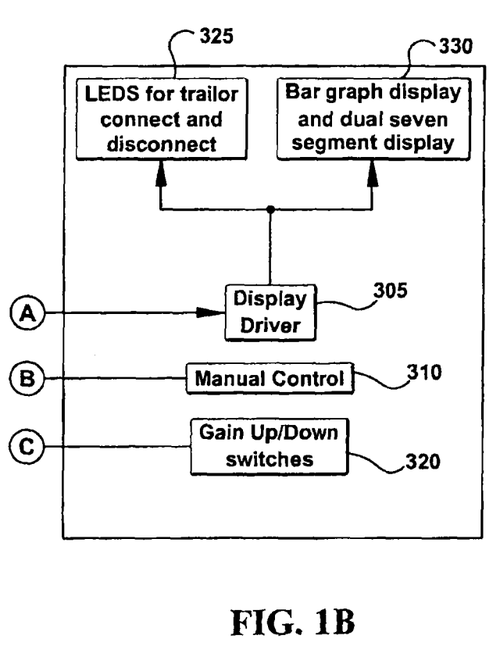
FIG. 1B is an exemplary electrical block diagram of a brake control unit, according to an embodiment of the present invention.
Figure 2:
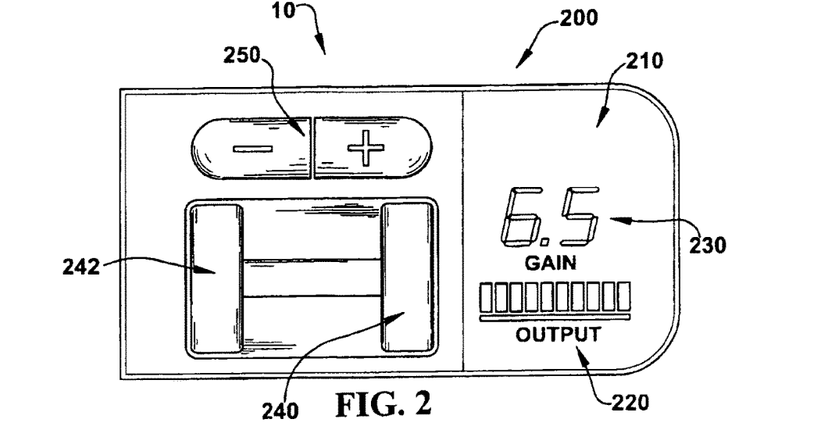
FIG. 2 is a front view of a faceplate display of an embodiment of the brake control unit.

As shown in the electrical block diagram of FIG. 2, the brake control unit 10 can receive and send signals via a communication bus 20, such as the high speed controlled area network (HSCAN) bus 20 shown. For example, the brake control unit 10 can receive and send signals relating to wheel speeds of the towing and/or towed vehicle, vehicle state information from ABS, brake-on-off, etc. The brake control unit 10 can also receive signals from the brake pressure transducer 30 (BPT) of the towing vehicle, and can also receive a power signal 40. The brake control unit 10 is grounded 50 as means of protection and safety. The brake control unit 10 is also capable of: sending signals to the brakes of the towed vehicle 60; sending signals to the stoplight 70 of the towed vehicle, including stoplight power 75; sending other signals to the towed vehicle; and sending signals to the towing vehicle. The brake control unit 10 is also capable of receiving information regarding the ignition of the towing vehicle 80.

Further, the brake control unit 10 can include an input/output buffer and filtering device 100. The brake control unit 10 also can include a load dump and reverse connection protection device 110, BPT power interface 115, output drivers with current sense and flyback 120, and a communication bus interface 130. The brake control unit 10 can also include a voltage regulator and watchdog with reset 140, a stop light drive 160, and a power failure advanced notice 170. It should be understood, however, that the brake control unit 10 may be alternatively configured and should not be limited to the embodiment shown in the drawings.

Figure 3:
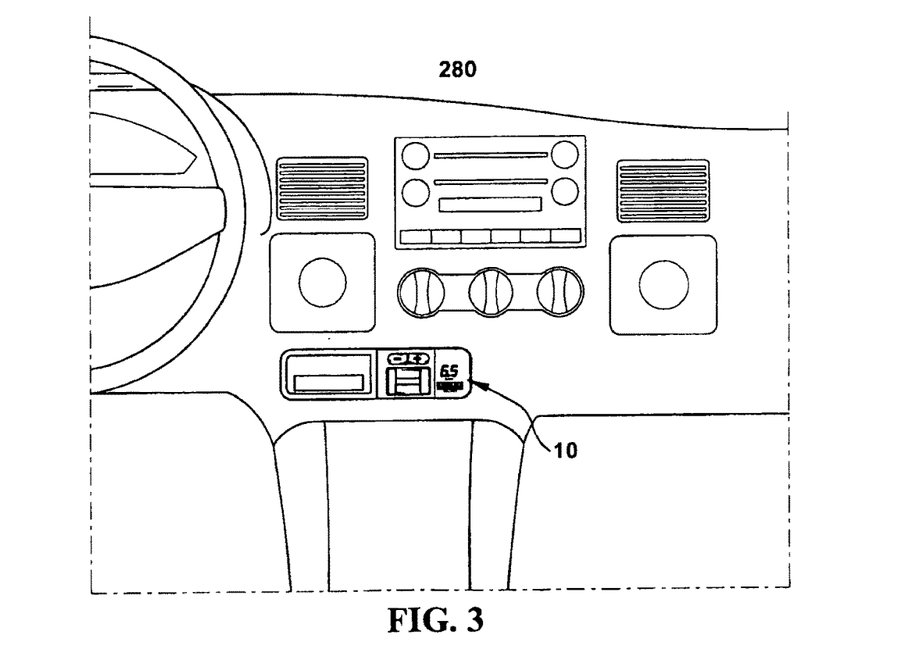
FIG. 3 is a front view of the faceplate display of an embodiment of the brake control unit integrated with the instrument panel of a towing vehicle.

Finally, the brake control unit 10 includes a faceplate display 200, which is shown in FIG. 3. It should be understood that the brake control unit 10 is not limited to the faceplate display shown in FIG. 3. Any sort of display system can be used. The brake control unit 10 drives the faceplate display thereof to communicate information such as percentage of brake signal output, gain value settings, and trailer connectivity status. In one embodiment, the brake control unit 10 utilizes a display 230 for displaying the current gain setting, such as two seven segment displays. The brake control unit 10 may use another display to represent the current brake control output level, such as a ten segment bar graph 220 shown in the drawings. Finally, a trailer icon 210 that uses an operator notification system to indicate a connected and disconnected state, e.g., a green state symbolizing the connected state and a red state symbolizing a disconnected state. In an exemplary embodiment a light emitting diode can be used to indicate the towing vehicle connected and disconnected state. Finally, the faceplate display may include a manual override control 240, which may have a thumb rest 242, and gain switches 250, which are described in more detail below.

Figure 4:
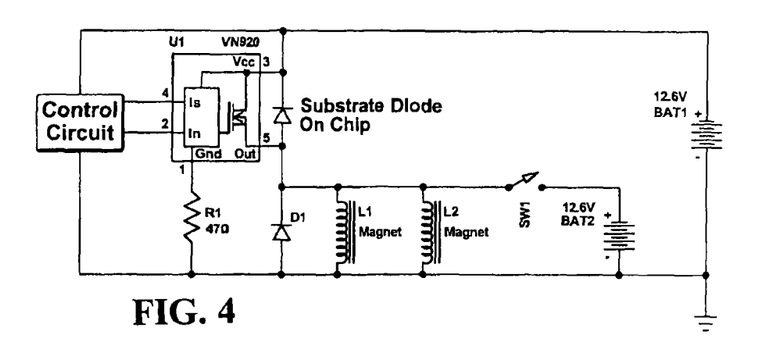
FIG. 4 is an electrical schematic of a typical connection of a brake control unit without reversed battery protection.

The brake control unit 10 can be fully integrated with the towing vehicle, as shown in FIGS. 3 and 4. This allows the brake control unit to be originally installed equipment in a towing vehicle. In other words, the brake control unit can be a factory-installed option on a towing vehicle. In such circumstances, the displays and the controls for the brake control unit are integrated into the instrument panel 280 of the towing vehicle. As such, it is imperative that the controls operate similarly to the other controls contained in the towing vehicle's instrument panel. In particular, automatic dimming and light harmony with the dash lighting elements is important.

Accordingly, the brake control unit incorporates a mechanism via software and hardware interface to adjust the lighting intensity of the displays to coordinate with the intensity of the dash lighting elements of the towing vehicle. The adjustment of the brake control unit display is triggered through a message list being received via the towing vehicle communication bus. This adjustment is controlled through communication with the display driver and the display elements, such as by serial communication. Through a series of commands the functionality of the display, for example, dimming, blinking, setting element values, scrolling, etc., can be modified. For example, the gain buttons on the brake control unit are backlit to assist the operator in locating these adjustment devices. The intensity of the back lighting is also varied based on the operator's adjustment of the interior dash light adjustment of the towing vehicle.

In order to operate the components above, the brake control unit 10 includes a processor 300. As used herein, the term "processor" may include a general-purpose processor, a microcontroller (e.g., an execution unit with memory, etc., integrated within an integrated circuit), a digital signal processor (DSP), a programmable logic device (PLD) or an application specific integrated circuit (ASIC), among other processing devices. The processor must have enough on-board memory to contain the software requirements to communicate with the towing vehicle's communication bus (such as the CAN or a high-speed controlled area network (HSCAN)), or other communication systems (such as a local interconnect network (LIN) and a J1850), in-vehicle diagnostics, and required functionality for interpreting vehicle and driver inputs. It must also have the capabilities to provide proper control to the: brakes of the towed vehicle, towing vehicle stop lamps during a manual braking event, towed vehicle stop lamps during a manual braking event, and faceplate display information accessible to the operator. Further, as shown in FIG. 2, the processor 300 is operably coupled to a display driver 305, a manual control override 310, and gain up/down switches 320. The display driver 305 is operably coupled to the LEDs for trailer connect and disconnect 325 (discussed in more detail below) and a bar graph display and dual seven segment display 330. It should be understood that alternative configurations are also contemplated herein, not just that shown in the drawings.

As previously stated, the brake control unit generates an output signal based on a variety of information received from the towing vehicle (as well as other information from the operator and the towed vehicle). This towing vehicle information can be received through hard-wired inputs from a brake pressure transducer, a brake on-off switch, and an ignition run line, as shown in FIG. 2. Additional vehicle provided information can be received through the towing vehicle's communication bus. Although, towing vehicle information from the brake pressure transducer, brake on-off switch, and ignition line can also be received through the towing vehicle's communication bus. Among the information received via the towing vehicle's communication bus is the redundant brake signal status, the brake on-off status, ABS event in progress flag, wheel speed data, vehicle deceleration data, and dimming information for the faceplate display. Most signals received by the brake control unit will be "debounced," meaning that in order for the brake control unit to output a signal based on the input, it will receive more than one such input signal. It is used to verify each signal so that one rogue signal will not inadvertently alter the brakes of the towed vehicle. The brake control unit also sends out information on the brake control unit system status via the towing vehicle's communication bus. These messages are displayed on the instrument cluster message center in the towing vehicle.

One of several input factors used to effectively apply the brakes of the towed vehicle by, e.g., obtaining the appropriate voltage to apply to the brakes of the towed vehicle, is a speed signal. As electric brakes are speed dependent in their operation to most effectively and efficiently operate the brakes speed must be considered and accounted for. The speed signal may be received from the towing vehicle or even the towed vehicle via a speed meter, such as a global positioning system (GPS) receiver, a wheel speed sensor, an engine speed sensor, a throttle position sensor, a Doppler sensor, etc. Alternatively, the speed signal may be received from the speedometer of the towing vehicle.

Additionally, the brake control unit can receive an input signal from the brake pressure transducer (BPT). The BPT input signal can be received via the towing vehicle's communication bus or through hard-wired inputs. This input signal represents the braking effort by the operator. When the brakes of the towing vehicle are not active (pressed), there is certain offset voltage present on the output of the BPT. This offset voltage needs to be nulled to determine the input signal representative of the braking effort. The offset signal is acquired when the brake control unit is in the idle mode. In this mode, there is no manual or automatic braking event. Several samples are acquired and averaged to determine the offset voltage. During a normal braking event, the BPT input voltage is sensed and the offset voltage is subtracted from it.

A performance feature of the brake control unit is that it can detect a failure of the BPT. In this situation, the brake control unit will sense the voltage supplied by the BPT when the brake-on-off switch (stoplight switch) or the redundant brake signal indicates an active braking. If this voltage is lower than or the same as the offset voltage, a failure of the BPT has occurred (there is no pressure in the BPT) and the event is reported, e.g., storing such event as part of the diagnostic information.

The brake control unit can also receive an input signal from the towing vehicle's anti-lock braking system (ABS) so as to adjust the application of the towed vehicle's brakes. In particular, the algorithm applies the ABS signal of the towing vehicle and responds to that signal by altering the brakes of the towed vehicle based on the ABS event. For example, the algorithm can cause the towed vehicle to continue to fully brake if the ABS is triggered due to wheel slip on a high μ surface, or can be used to reduce the braking to the towed vehicle if the ABS condition results from braking on a low or split μ surface. Using the ABS signal allows the total braking event to become more stable. Alternatively, the brake control unit may use a speed signal and/or accelerometer as an input to provide a stable braking event as described below.

More specifically, when an ABS event occurs on the towing vehicle or when the speed signal input or accelerometer input indicate, the brake control unit will attempt to provide stable braking. It may first release the brakes to ensure that the towed vehicle wheels are not locked. Then it may reapply the towed vehicle brakes based on a deceleration input, e.g., a signal supplied from the ABS system over the towing vehicle communication bus. This strategy may remain in effect until the brake event has ceased, or until the ABS event has ceased.

Further, the brake control unit is aware of the absence or invalidity of the ABS signal and deceleration signal and stores the diagnostic information thereof. If the ABS signal and/or deceleration signal are absent or invalid, the brake control unit uses a proportion of the BPT signal, such as 50%, to reduce the power to the brakes of the towed vehicle to prevent the wheels of the towed vehicle from locking in case an ABS braking event is occurring.

The brake control unit can also receive the vehicle identification number (VIN) from a particular towing vehicle and configure itself based on that particular vehicle's variables, such as its brake systems, stability systems, wheel base, 4×4, 2×4, GVW, etc. The towing vehicle can store the VIN in its memory. The brake control unit can receive this information from the towing vehicle via its communication bys. Based on the VIN, the brake control unit uses its algorithms stored in the processor (or can modify such) to configure the towed vehicle's brakes (including their braking curve) based on the variables of the towing vehicle with that particular VIN. The brake control unit can also configure itself based upon variable of the particular towing vehicle with that particular VIN.

The brake control unit can receive a signal from the towing vehicle that confirms whether or not such towing vehicle is configured to function with a brake control unit or with the particular brake control unit installed. The brake control unit can use the VIN, or alternatively, can use other information provided by the towing vehicle. This signal is sent over the towing vehicle's communication bus. If the brake control unit receives this signal from the towing vehicle, the brake control unit can notify the operator and will shut itself down to prevent unauthorized use.

Another input signal that can be sent to the brake control unit is whether the ignition of the towing vehicle is on or off. The brake control unit uses at least one algorithm stored in the processor that is based on sensing the ignition of the towing vehicle or the lack thereof. The ignition input signal can also be used as part of the sensing for a sleep mode of the brake control unit. In the sleep mode the idle current can be minimized for the brake control unit to minimize the drain of the battery on the towing vehicle. In other words, when the ignition of the towing vehicle is turned off, a signal is sent to the brake control unit via the communication bus instructing the brake control unit to go into a sleep mode. In this sleep mode, the brake control unit draws significantly less voltage. The ignition signal going to high, or on, is used to wake up the brake control unit. In this case, when the ignition is turned on, the brake control unit is awakened. It will draw sufficient voltage to be completely active. An alternative method for waking the brake control unit up is to base it on towing vehicle communication bus activity. The brake control unit can be programmed such that any towing vehicle communication bus activity can wake up the brake control unit. As with the ignition on-off, when there is little to no towing vehicle communication bus activity the brake control unit goes into a sleep mode. This also minimizes the idle current down to the microampere level. When communication bus activity resumes, the brake control unit is awakened.

Additionally, the brake control unit has access to the park, reverse, neutral, drive, and low gear signals of the transmission of the towing vehicle to further modify the brake output signal. Again, algorithms stored in the processor can be altered and/or a particular algorithm(s) selected based on this additional input. This is useful because towed vehicle brakes do not have the same braking efficiency in reverse as they do in forward. For example, if the towing vehicle is in reverse, a signal is sent to the brake control unit notifying of such reverse condition. Then, the brake control unit sends a brake output signal to apply more voltage to the brakes so that they may be applied more aggressively. Therefore, the algorithms can be adjusted based on this information to effectively and efficiently apply the brakes for the current gear setting.

Another input signal that can be used to adjust the braking output is the powertrain load of the towing vehicle. The load on the powertrain can be used to help determine the total load (weight) of the combination of the towing vehicle and the towed vehicle. This information is inputted from the appropriate sensor into the appropriate algorithm to configure the brake control unit to have an improved braking performance based on the actual weight of the towing vehicle and towed vehicle.

In addition to automatic inputs, the brake control unit can use inputs manually entered from an operator to control the output of the towing vehicle brakes by using predetermined algorithms, modifiable algorithms, or both. In particular, an operator can manually enter an input and the brake control unit can output a brake output signal that can apply the brakes of the towed vehicle in a predetermined manner based on such input.

One operator input available is the gain buttons, which may be present on the faceplate display of the brake control unit. The gain buttons can provide several different inputs to the brake control unit. For example, holding the gain buttons simultaneously with the brake-on-off active input may allow the brake control unit to change its configuration to allow the algorithm to convert from electric brake curves to electric over hydraulic algorithms (or brake curves). Other operator interface controls of the brake control unit can be used in combination to achieve other means to alter configurations of the brake control unit. Since the load sensing and performance curves are significantly different for the two types of braking systems, this allows for adapting the brake control unit via the operator input to a unique algorithm(s) for electric over hydraulic brakes. Also, the display can show the use of the alternate configurations to notify the operator of the configuration currently set. For example, a flashing digital character representation may show that the brake control unit is interfacing to an electric over hydraulic braking system.

Another input the gain buttons can provide is to adjust the maximum duty cycle available. More specifically, if manual activation occurs during a normal or ABS braking event the greater of the two duty cycles, i.e., a normal ABS event or a limited operating strategy (LOS) deceleration braking event, is used. The determined duty cycle is then adjusted according to the current gain setting. The gain setting is used as a multiplier to the duty cycle. Therefore, it will produce an output that is scaled to a certain percentage of the current braking level the operator is requesting. For example, if the operator is requesting 75% desired braking capacity at a gain setting of 6.0, the brake control unit will provide 45% of the maximum duty cycle available (60% times 75%).

Additionally, along with the gain setting the reference speed is inputted into a transfer function. This scales the gain adjusted duty cycle output according to the towing vehicle speed. At low speeds, a scaled percentage of the brake output signal is computed based on the curve that is present in a lookup table present in the processor. This thereby causes reduced braking strength at lower speeds to prevent the brakes of the towed vehicle from jerking. At higher speeds, the brake output signal is set to 100% of calculated duty cycle. This duty cycle value is stored to be used for the output display on the brake control unit console. The unadjusted value of this signal is used to drive the bar graph display on the brake control unit console, thereby, communicating to the operator the total level of braking requested at a specific gain setting.

As showing in FIG. 3, the present embodiment of the brake control unit uses two separate buttons, one to increase and one to decrease the gain setting. Pressing each button activates its own momentary push switch. It should be understood, however, that any number of buttons can be used herewith. Additionally, any sort of device can be used, not just the buttons shown. For example, one could use a slide, knob, touch-screen, etc.

Another operator input that is present on the faceplate of the brake control unit is a manual override control. The manual override control can be, e.g., a manual slide having a linear travel potentiometer, controlled by the towing vehicle operator. In this embodiment, the manual slide can be part of the brake control unit faceplate and is spring-loaded to an at rest (inactive) position. This input to the brake control unit allows the operator to manually apply towed vehicle brakes without having to depress the brake pedal. The manual override control is mainly used in conjunction with the gain adjustment buttons described above to calibrate maximum towed vehicle braking available based on specific towed vehicle loading, towed vehicle tire and brake conditions, and road conditions. Normal maximum is that braking force that is just short of causing the wheels of the towed vehicle to skid. When the operator activates the manual override control the brake control unit sends a signal over the communication bus to the towing vehicle. Additionally, whenever there is a normal braking event, e.g., the operator depressing the brake pedal of the towing vehicle, a signal is also sent to the towing vehicle from the brake control unit via the communication bus.

In order to communicate between the towing vehicle, the towed vehicle, and the brake control unit, the brake control unit utilizes communication bus methods. The brake control unit extracts data from the towing vehicle's bus as well as transmits information to the towing vehicle's bus to interface with other subsystems in the towing vehicle, e.g., cluster, ABS, vehicle stability systems, transmissions, dimming features, etc. The brake control unit is in constant communication with the towing vehicle's communication systems and can alert the operator and other vehicle systems of operation, lack of operation, defects found within the interfacing systems, etc. In particular, the brake control unit receives and sends messages over the towing vehicle's communication bus interface. The trailer brake controller periodically transmits status message information over the towing vehicle communication bus interface. These messages include diagnostic messages, data interfaces to other modules of the towing vehicle, and informational and alert messages to the cluster, which in turn displays visual alerts and initiates audible alerts.

In addition to the communication bus above, the brake control unit can also receive a measure of the brake pressure from a brake pressure transducer mounted to the master cylinder of the towing vehicle. The brake control unit can also receive inputs from an operator interface, including a set of gain switches and a manual brake apply lever, which independently actuates the towed vehicle's brakes.

Integrating the brake control unit with the towing vehicle's communication system using the towing vehicle's communication bus also allows information relating to the brake control unit, the towing vehicle, and the towed vehicle to be stored. For example, brake control unit diagnostic code information and other events that can assist a service technician in diagnosing failure modes in the brake control unit or other modules (including those of the towing vehicle) it interfaces with can be stored.

The brake control unit collects and stores information in memory, for example in electrically erasable programmable read-only memory (EEPROM) or Flash memory, to allow for diagnostics, life cycle management, etc. of the brake control unit, the towing vehicle, and/or the towed vehicle. More specifically, the brake control unit can read and store the number of ignition cycles, the gain adjustments, number of manual activations, the VIN of the towing vehicle, calibration data, other defect codes during the life of the brake control unit, serial number of the brake control unit, date of manufacture of the brake control unit, and other configuration management data of the brake control unit. This information is useful in understanding the life of the brake control unit as well as representing the conditions the brake control unit has been subjected to throughout its life. For example, storing the serial number of the brake control unit helps traceability of the unit itself as well as the components that make up the unit. This helps with the serviceability of the unit and its components. Additionally, the diagnostic section determines if a valid fault exists. If it does, it is stored in memory. Again, this assists a technician with maintenance of the brake control unit. Finally, depending on the severity of the fault the towing vehicle may be notified that a serious fault exists that could hinder the normal operation of the brake control unit. The towing vehicle will notify the operator of such fault occurring, for example, through the cluster message center. If the fault is not severe, it is merely stored in memory to be accessed by a technician at a later time.

Many specific codes can be used with the brake control unit to allow it to diagnose other subsystem failures of the towing vehicle, towed vehicle, and brake control unit and report this information back via the communication bus so the towing vehicle, brake control unit, and towed vehicle can be diagnosed. The brake control unit has complete self-diagnostics as well as diagnostics for interfacing with other components of the towing vehicle and towed vehicle, such as brake pressure transducer, ABS system, brake on-off, cluster instrument panels, vehicle stability system, and power distribution. This allows for real-time troubleshooting and adjustments to algorithms for performance based on the diagnostic capabilities built into the brake control unit. More specifically, the brake control unit can, based upon the diagnostic information received from the towing vehicle or towed vehicle, adjust the algorithms stored therein to optimize its operation. For example, the brake control unit can receive diagnostic information regarding the ABS system of the towing vehicle and can adjust the brake output signal to account for the specific operation of the ABS system.

In an embodiment, the brake control unit uses memory to store information relating to every ignition cycle of the towing vehicle. The storage and usage of this information generated in such a manner that minimizes the storage size so a small microprocessor can be used, for example a Motorola Mc68HC908AZ32A. The brake control unit utilizes a storage array as a fixed area of memory within which may exist a number of ignition configurations. The ignition configuration is a variable length stored data grouping for a specific vehicle ignition cycle and includes an end of configuration marker. After several ignition cycles there will be several ignition configurations stored. Each will follow the previous ignition configuration then wrap back to the beginning of the storage area when the end of the storage array has been reached. At start-up the brake control unit looks for the end of configuration marker that is always written at the end of the latest configuration. This configuration is then used to initialize the current operating variables and diagnostic information of the brake control unit. The current configuration overwrites the previous end of configuration marker with a new ignition configuration. For example, the most current ignition cycle configuration is followed with two or more bytes of storage in their erased state. At a power on/reset event the presence of two or more bytes of storage in their erased state would identify the most current ignition configuration. The number of valid ignition cycles is stored in an ignition configuration as an increment of the value stored during the previous valid ignition cycle.

In addition to the number of valid ignition cycles, operating characteristics of the brake control unit, such as the gain setting, operating characteristics of the towing vehicle, operating characteristics of the towed vehicle, the number of diagnostic failures, and the diagnostic failure information can be stored in the ignition configuration. The diagnostic failure information includes the failure that occurred, the number of ignition cycles such failure occurred, and the number of ignition cycles since the last occurrence of such failure. Each ignition configuration also includes a checksum to assist in identifying good or incomplete/incorrect data stored in a specific ignition configuration. A technician can then access the information stored in the ignition configuration to diagnose any problems with the brake control unit, towing vehicle, or towed vehicle.

When the diagnostic mode of operation has verified that certain specific faults have occurred, a limited operating strategy, which is described in more detail below, is entered. The diagnostic mode runs simultaneously with the operational modes of the module. It runs a system of tests to verify certain faults that have occurred during normal operations and also determines whether the module should enter the limited operating strategy.

The brake control unit includes several performance features and safety characteristics built therein. For example, the brake control unit has a redundancy built into it. This redundancy is a limited operating strategy (LOS). It allows the brake control unit to continue to function despite the main input (e.g., brake pressure transducer) being unavailable. This permits the brake control unit to give the operator the ability to brake at a comparable deceleration mode to the current controls despite losing the main input. It, also, notifies the operator of the error by requesting the instrument cluster, via the communication bus, to display a message regarding the error. In an embodiment of the current brake control unit, BPT is the primary input, deceleration is the secondary redundancy, and the final default would be a time-based output as a third means for redundancy. In the situation in which BPT has failed, the deceleration signal from the communication bus is used to calculate the brake output signal, which can be represented as: PWM %=f5(deceleration)*f2(speed)*f3(gain)*f4(voltage). If the deceleration signal is unavailable, a time-based output is used to calculate the brake output signal, which is defined as follows: PWM %=f6(time)*f2(speed)*f3(gain)*f4(voltage). This will allow the brakes of the towed vehicle to active despite failures of the BPT, ABS, and/or communication bus.

Another performance feature is that the brake control unit automatically adjusts its output based on variable inputs from the vehicle. The brake control unit continuously samples the supply voltage and will adjust its algorithm to keep the brake control unit voltage output consistent even with variations in the supply voltage. The algorithm will adjust the duty cycle of the PWM to maintain a constant energy to the towed vehicle brakes. For example, the brake control unit will continually monitor the supply voltage of the towing vehicle to ensure that such voltage is within a normal range. If the supply voltage is lower than normal, e.g., from a loss of the alternator, then the PWM is increased to maintain a constant output energy to the brakes of the towed vehicle.

Another performance feature included in the brake control unit is inductive and resistive load sensing for detecting proper loads of the brakes of the towed vehicle. The brake control unit monitors the current in the towed vehicle's brake line over a predetermined time, for example, every four seconds, to determine if the load that is present represents a normal electric towed vehicle brake system. The primary feature of the brake magnets is that it has a certain range of resistance and inductance. Accordingly, the brake control unit performs the resistive test more quickly, for example every 4 milliseconds, instead of the time that it takes for the inductive test. The resistive test verifies that the resistance of the load is within range. The results of the resistive test are further "debounced" to make sure that one erroneous reading is not counted. A change in the result of the resistive test causes the inductive load sensing to be performed to confirm that the load present has inductive value within range. The feature of the inductive load that is used is its exponential current rise with a step input voltage. The resistive test is performed every loop cycle, regardless of connectivity status. The purpose of this test is to expedite the indication of an open load, if one exists, within a specific time, e.g., 4 milliseconds, after it occurs. Normally, the inductive test is performed if the resistive test passes every set period of time, e.g., 4 seconds, when the resistive test has indicated that the trailer is connected. In the case that the resistive test indicates a disconnected load for the first time after having shown a connection in the past, this triggers an immediate inductive test. This is done because the resistive test requires significantly less current than the inductive test and does not cause the towed vehicle brakes to apply. The inductive test finally determines the connectivity status of the towed vehicle. However, during a braking event, all tests are suspended to prevent interference with the trailer brake control output. Regardless of the outcome of the inductive/resistive tests, the brake output signal is applied to the towed vehicle brakes during a braking event.

If the inductive test determines the presence of a normal load, it is indicated to the operator via a display on the faceplate of the brake control unit, such as trailer icon being lit green. This display will also indicate when the towed vehicle load is present and the towed vehicle brake control is active. If the towed vehicle becomes electrically disconnected during a dynamic state, such as while towing vehicle is moving above a certain speed (or moving at all), a display, such as a trailer icon flashing red continuously, notifies the operator of such condition. The towing vehicle is notified of such condition and the display on the instrument panel is activated and the cluster sounds a chime to immediately notify the operator. If the towed vehicle becomes disconnected during a static state, such as unplugging the towed vehicle while it is standing still, the icon flashes for a predetermined time, for example approximately 30 seconds, then shuts off. No chime is set since it is assumed to be a normal condition. However, the operator is still notified of the event in case someone inadvertently removed the connection.

The initial start-up status or default status for the towed vehicle upon start-up is "trailer not connected." From this status, if the inductive test output passes, the module will enter the "trailer connected" state. If, on the other hand, the inductive test output fails while in the "trailer connected" state, the module will enter the "trailer disconnected" state. If the inductive test output passes while in this state, the module will revert back to the "trailer connected" state. When a "trailer disconnected" state exists, the brake control unit will determine what sort of disconnection has occurred, a static or dynamic disconnection. In the static disconnection state, the towing vehicle is traveling below a minimum speed. In the dynamic disconnection state, the towing vehicle is traveling above the minimum speed. It should be understood that the minimum speed may be zero so that any movement triggers a dynamic disconnection state.

Another performance feature is that the brake control unit integrates a short circuit protection for both the towed vehicle brake output line and the stop lamp drive output line. Both circuits are continuously monitored and are protected in the event a short on either of these lines exists. The short circuit sensing is continuous and automatically reactivates in a normal mode of operation once the short is removed. The input power voltage is monitored. When the control signal to the input of the POWER MOSFET is activated, the input power voltage is monitored to sense a sag in it. If this sag crosses a predetermined threshold, e.g., 50%, a shorted condition will be determined. In case of the stop lamps, there is a delay before this sag in input power supply voltage is sensed. The reason for this is the inrush currents in the incandescent stop lamps typically used in the automobiles lasts for a varying time, e.g., about 50 msec or more depending on the temperature. Alternatively, the output voltage can be sensed and compared with the power supply voltage before turning the stop lamps on.

The circuitry is also designed to identify if the stop lamp circuit is to be driven by the brake control unit if the manual override control is activated, or through the brakes-on-off circuit on the towing vehicle. There is constant sensing of the brakes-on-off line and a decision is made if the brake control unit is to drive the brakes-on-off line high or shut down its drive to the brakes-on-off line if the manual override control mode is engaged. There is only one source to supply the brakes-on-off line so there is only one current source for the stop lamps.

The stoplights of the present embodiment are driven from a dedicated voltage input, separately fused, where most brake control units drive the stoplights from a common voltage input with the brake output power. The current from most common sourced voltage input can be significant enough to cause opening of a circuit breaker or a fuse rendering the brake control unit inoperative. The dedicated input of the present brake control unit, on the other hand, eliminates the additional current draw from the main voltage input.

Similarly, the incorporation of the field effect transistor (FET) in the brake control unit output line allows for protection against the destruction of the circuit due to a reverse polarity situation on the primary supply. It also protects against a reversed breakaway battery installation on the towed vehicle, which puts a negative 12 volts back onto the towed vehicle brake output line of the control brake unit when a breakaway switch is pulled. Normally a diode is placed across the towed vehicle brake output line to ground to maintain the brake magnet current in the off time of the PWM. This same diode becomes forward biased in a reverse breakaway battery application and places 12 volts across the diode and destroys the diode and the circuit board. The use of the FET allows for opening of the ground line during abnormal conditions protecting the brake control unit and allowing for passing of the brake current under normal operations without sacrificing voltage drop or heating.

Figure 5:
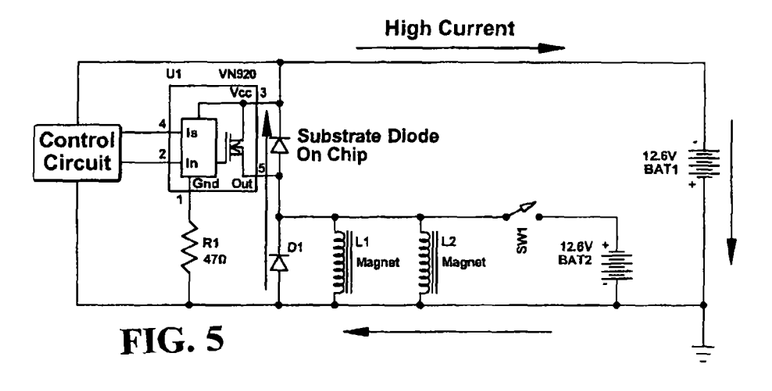
FIG. 5 is an electrical schematic of a reversed connected towing vehicle battery.

FIG. 5 is a typical connection of a brake control unit without reversed battery protection. This figure shows the output stage (U1) of that brake control unit in which a single VN920 high side switch is used. Other optional configurations may include using two or more VN920s in parallel, one or more power MOSFETs in parallel, or one or more power transistors in parallel. U1 delivers a PWM (Pulse Width Modulated) drive to the brake magnets L1 and L2. (Most towed vehicles use from 2 to 8 magnets in parallel.) The frequency of this signal is usually in the 200 Hz to 400 Hz range with a duty cycle ranging from 0% to 100%.

While U1 is on, battery voltage is applied and current builds up in the magnet. While U1 is off, the current established in the magnets continues to flow through D1.

The duty cycle times the battery voltage is the effective voltage applied to the brake magnets. The current does not continue to increase because each magnet has a resistance of about 4 ohms due to the resistance of the copper wire.

Most towed vehicles have a breakaway system to apply voltage to the magnets in case the towed vehicle becomes disconnected from the towing vehicle. Si is the switch that connects BAT2 to the magnets. BAT2 is sized to provide braking for about 15 minutes. This stops the towed vehicle and keeps it from rolling until chocks or such can be placed in front of the tires.

Figure 6:
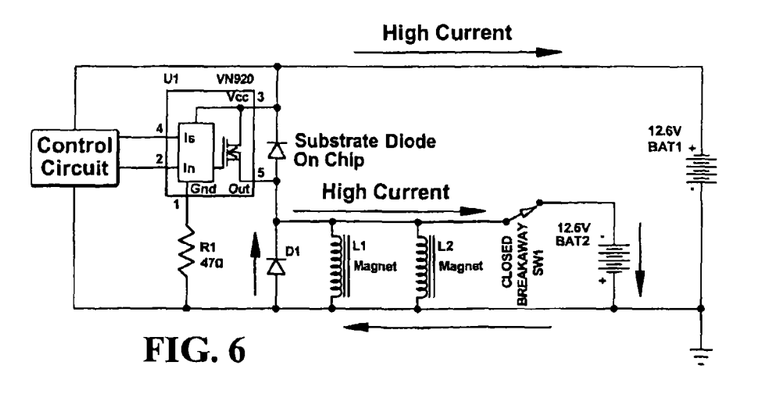
FIG. 6 is an electrical schematic of a reversed connected breakaway battery with the breakaway switch closed.

FIG. 6 shows a reversed connected towing vehicle battery. As can be appreciated D1 and the substrate diode in U1 provide a very low resistance path for current to flow. Typically the brake control unit and or the wiring are destroyed. This can occur when installing the brake control unit or when installing the battery in the towing vehicle.

Figure 7:
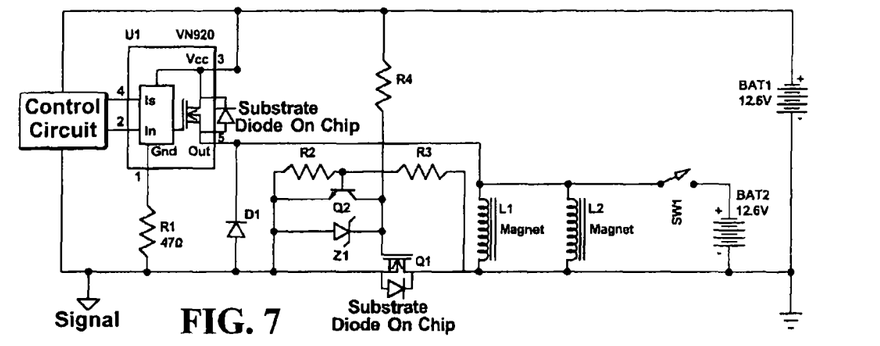
FIG. 7 is an electrical schematic of the parts required to prevent damage from reverse connection of either battery.

FIG. 7 shows a reversed connected breakaway battery with the breakaway switch closed. D1 is now forward biased by the battery causing high current to flow, which normally results in damage to the control and wiring.

Figure 8:
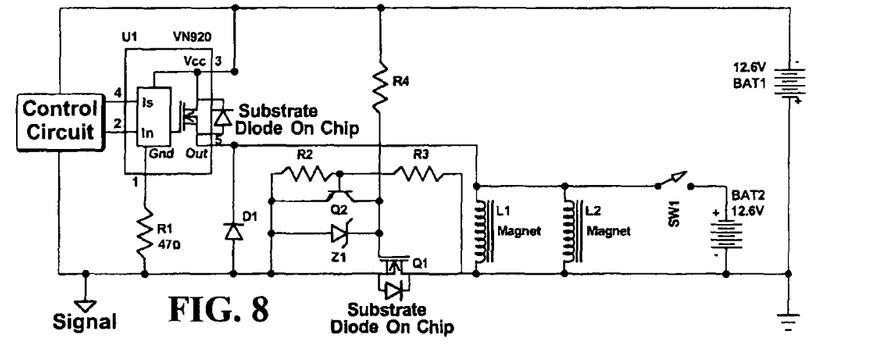
FIG. 8 is an electrical schematic of the reversed connection of the towing vehicle battery.

FIG. 8 illustrates the parts required to prevent damage from reverse connection of either battery. The MOSFET Q1 is a high current MOSFET capable of handling the currents of normal operation. The major current is the fly back current from the magnets. It can reach 24 amps with 8 magnets. Q1 is biased full on by the connection of the gate to 12.6 volts through R1. This keeps the on resistance below 10 milliohms for preferred MOSFETs. This resistance dissipates very little power during operation. It will be noticed that Q1 serves as a controlled switch isolating the circuit ground from chassis ground when the switch is off.

Figure 9:
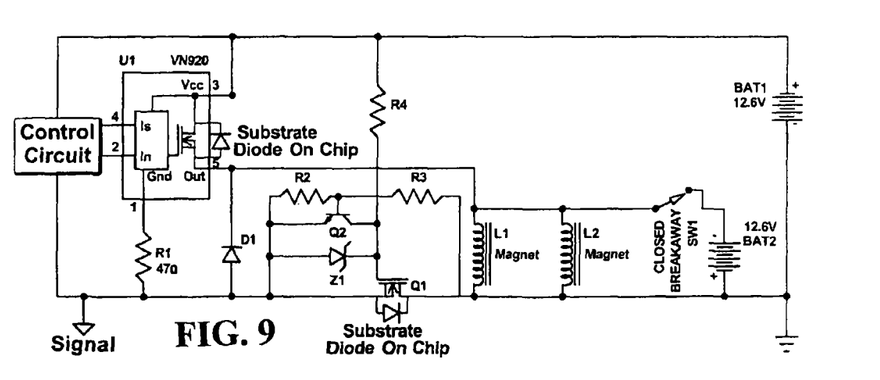
FIG. 9 an electrical schematic of a reversed connection of the breakaway battery.

FIG. 9 depicts the reversed connection of the towing vehicle battery. In this case the gate is biased at or below the Q1 source voltage and so Q1 is off and the circuit is protected from heavy current. If the towed vehicle is connected current will flow through the magnets and the substrate diode in U1. This current will be limited to a safe level by the magnet resistance.

FIG. 10 shows reversed connection of the breakaway battery. In this case when SW1 is closed a spike of heavy current will flow. This current will develop a voltage drop across the on resistance of Q1. The divider voltage formed by R2 and R3 will reach the base-emitter voltage of Q2 when the current is at the desired trip point. When Q2 starts to turn on the gate of Q1 is pulled down. This results in the drain voltage rising and provides a snap action with the positive feedback.

Another safety routine is to determine stuck operator inputs, such as the gain button scroll and stuck manual override control (e.g., stuck manual slider routine). These allow for continuous sampling of inputs that should normally be activated by the operator to determine if the inputs are real or if a mechanical or electrical failure has occurred. The sampling routine of the + and − gain buttons, along with the variables of ignition, brake-on-off, speed, and manual input allow for determination of the inputs being legitimate and indexed accordingly or to disable this section of the brake control unit and default back to a prior setting. A notification is then sent to the operator regarding the error. A stuck gain button could result from a mechanical or electrical failure. This could lead to continuous cycling of the gain without brake activation. This could also result if something was moving inside the cab of the towing vehicle and was pressing against the control. When the operator depresses a gain button, if the gain limit is reached and the operator continues to hold it for a period of time, the gain setting will return to the value prior to the change. A depressed and held gain button scrolls through settings until released or until the maximum or minimum value has been attained. The selected gain setting is stored in memory, e.g., EEPROM or Flash/memory, for future use.

A diagnostic feature for operator inputs is a manual override control input, e.g., a manual slider input, sensing for out-of-range (high and low out-of-range) and in-range. The software and hardware used for this allows for the determination of a fault mode, out-of-range, that puts the brake control unit into a potential brakes-on-all-the-time mode, or low to no-brakes with the manual invoked. The out-of-range allows for flagging internal part issues that may arise due to components, manufacturing, assembly, etc.

Additionally, the brake control unit includes stuck manual override control input sensing. This permits notification to the operator of the towing vehicle of potential hazards of a stuck manual override control input while the manual input is in-range and allows for an alternative algorithm that shuts this portion of the brake control unit down until the problem has been resolved. These safeguards will prevent damage to or destruction of the brakes of the towed vehicle in the event that the brake output signal says it should be active when it should not be. The brake control unit samples this input along with the speed input to allow for an accurate decision to be made regarding this condition. The stuck manual override control, e.g., stuck slider position, is saved in memory, e.g., EEPROM or flash memory, during an ignition configuration so that during a subsequent ignition cycle, the stuck manual override control, e.g., stuck manual slider, fault will remain active.

Additionally, the brake control unit determines the present mode of operation of the control system. The modes are: power-up (wake-up), power-down (sleep), normal operations, and diagnostics (limited operating strategies). Upon turning on the towing vehicle, the brake control unit determines the present mode of operation by using software stored on the processor's memory. During operating of the brake control unit, it will continually determine the present mode of operation until the brake control unit is powered down.

In the power down mode, the brake control unit prepares to shut down and stop execution. The ignition voltage is verified to be below a threshold to continue the shut down procedures. The brake control unit output is then disabled, the display is shut down and any diagnostic data is stored in memory and/or reported over the communication bus. Upon completion of these the power supply shutdown is initiated, the brake control unit is set into low power mode and the processor is issued a stop instruction shutting it down until the brake control unit is powered on again. The shut down is implemented using, for example, the system basis chip (SBC). The processor on detection of low ignition signal and after finishing all housekeeping functions sends a serial command to SBC to further shut down the process. The brake control unit initiates a power down sequence by disabling the brake control unit output, brake lamp control, and all brake control unit console display indicators are turned off, e.g., trailer icon, gain displays, and the bar graph. A flag is set in this state for modeling the power up/down strategies within the module. The power down mode can also be activated by inactivity on the communications bus. Alternatively, the power down mode can be activated solely by inactivity on the communication bus.

Once in the power down mode, the brake control unit will wake up after detecting a positive transition on the ignition input. For example, this can be done via the SBC. The SBC can also be woken up by activity on the communications bus. Alternatively, the wake up can occur solely by activity on the communication bus.

The brake control unit also includes a feature that detects when the software has entered an unintended operating condition and fails to follow a program code, e.g., program runaway, and resets the system for an orderly power up. This can be accomplished by including a device, such as a power-management chip or an SBC, in the brake control unit. The power-management chip must periodically receive a signal, such as a serial command, from the processor. In absence of this signal for a pre-determined period of time it will reset the whole system and proper operation will resume.

Modification of the invention will occur to those skilled in the art and to those who make or use the invention, including, without limitation, the values provided for the various elements disclosed above. It should be understood that such values are exemplary values and the present invention is not limited to those values. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method for controlling braking of a towed vehicle, the method comprising:
   receiving a first signal at a brake controller via a towing vehicle communication bus, the first signal relating to at least one operating condition of the towing vehicle; and
   sending a second signal from the brake controller to brakes of the towed vehicle, the second signal based on the first signal; and
   wherein the towing vehicle communication bus is configured to communicate electronic signals and the towing vehicle communication bus interconnects a plurality of components on the towing vehicle and is externally connected to the brake controller.

2. The method of claim 1, wherein the first signal is received by a processor from at least one of a brake pressure transducer of the towing vehicle, a brake-on-off line, towing vehicle interior lighting, memory of the towing vehicle, transmission of the towing vehicle, powertrain of the towing vehicle, an anti-lock brake system of the towing vehicle, a speed meter, an ignition of the towing vehicle, a speedometer of the towing vehicle, and a brake pedal of the towing vehicle.

3. The method of claim 1, wherein the first signal is received by a processor from a plurality of the following: a brake pressure transducer of the towing vehicle, a brake-on-off line, towing vehicle interior lighting, memory of the towing vehicle, transmission of the towing vehicle, powertrain of the towing vehicle, an anti-lock brake system of the towing vehicle, a speed meter, an ignition of the towing vehicle, a speedometer of the towing vehicle, and a brake pedal of the towing vehicle.

4. The method of claim 1, further comprising receiving a signal through the towing vehicle communication bus from a brake pressure transducer of the towing vehicle.

5. The method of claim 4, wherein the second signal is based on the first signal and the signal from the brake pressure transducer.

6. The method of claim 1, wherein the at least one operating condition comprises at least one of speed of the towing vehicle, speed of the towed vehicle, the towing vehicle's anti-lock brakes, vehicle identification number of the towing vehicle, condition of an ignition of the towing vehicle, selected gear of a transmission of the towing vehicle, and powertrain load of the towing vehicle.

7. The method of claim 1, wherein the at least one operating condition comprises a plurality of the following: speed of the towing vehicle, speed of the towed vehicle, the towing vehicle's anti-lock brakes, vehicle identification number of the towing vehicle, condition of an ignition of the towing vehicle, selected gear of a transmission of the towing vehicle, and powertrain load of the towing vehicle.

8. The method of claim 1, further comprising collecting and storing information in a memory to allow for diagnostics, life cycle management, and variables for future use.

9. The method of claim 1, further comprising interfacing with components of the towing vehicle to diagnose the components of the towing vehicle.

10. The method of claim 9, wherein the components of the towing vehicle comprises at least one of brake pressure transducer, anti-lock brake system, brake on-off, cluster instrument panels, stability system, and power distribution.

11. The method of claim 1, further comprising receiving a signal from the towing vehicle relating to detection of the ignition of the towing vehicle being turned off and sending a signal to a brake control unit via the towing vehicle communication bus instructing the brake control unit to power down.

12. The method of claim 11, further comprising receiving a signal relating to detection of ignition of the towing vehicle being turned on and sending a signal to the brake control unit to power up.

13. The method of claim 1, further comprising receiving a signal relating to a lack of activity on the towing vehicle communication bus and sending a signal to a brake control unit via the communication bus instructing the brake control unit to power down.

14. The method of claim 13, further comprising receiving a signal relating to detection of activity on the towing vehicle communication bus and sending a signal to the brake control unit to power up.

15. The method of claim 1, further comprising performing at least one of a limited operating strategy, an automatic adjustment of output based on variable inputs from the towing vehicle, an inductive and resistive load testing, an internal short circuit protection procedure, and a gain button and scroll stuck routine.

16. The method of claim 15, wherein performing the limited operating strategy comprises operating the brakes of the towed vehicle despite unavailability of a main input.

17. The method of claim 15, wherein performing the automatic adjustment of output based on variable inputs from the towing vehicle comprises continuously sampling supply voltage and adjusting the second signal based on the sampling.

18. The method of claim 15, further comprising performing inductive and resistive load testing comprising sensing load of the brakes of the towed vehicle to determine if the load is normal and sensing if the brakes are available on the towed vehicle.

19. The method of claim 15, wherein performing the gain button and scroll stuck routine comprises continuously sampling inputs activated by an operator and determining if the inputs are real or an electrical failure.

20. The method of claim 1, wherein the towing vehicle communications bus is a HSCAN communications bus.

21. The method of claim 1, wherein the towing vehicle communications bus is a CAN communications bus.

22. The method of claim 1, wherein the towing vehicle communications bus is a LIN communications bus.

23. A method for controlling braking of a towed vehicle, the method comprising:
receiving a first signal at a brake controller via a towing vehicle communication bus, the first signal relating to at least one operating condition of the towing vehicle; and
sending a second signal from the brake controller to brakes of the towed vehicle, the second signal based on the first signal;
wherein the towing vehicle communication bus is configured to communicate electronic signals and the towing vehicle communication bus interconnects a plurality of components on the towing vehicle and is externally connected to the brake controller; and
sending a third signal to the towing vehicle via the towing vehicle communication bus, the third signal based on at least one of the first signal and the second signal.

24. A method for controlling braking of a towed vehicle, the method comprising:
receiving a first signal at a brake controller via a towing vehicle communication bus, the first signal relating to at least one operating condition of the towing vehicle; and
sending a second signal from the brake controller to brakes of the towed vehicle, the second signal based on the first signal;
wherein the towing vehicle communication bus is configured to communicate electronic signals and the towing vehicle communication bus interconnects a plurality of components on the towing vehicle and is externally connected to the brake controller; and
wherein the at least one operating condition comprises a plurality of speed of the towing vehicle, speed of the towed vehicle, the towing vehicle's anti-lock brakes, vehicle identification number of the towing vehicle, condition of an ignition of the towing vehicle, selected gear of a transmission of the towing vehicle, and powertrain load of the towing vehicle.

25. A method for controlling braking of a towed vehicle, the method comprising:
receiving a first signal at a brake controller via a towing vehicle HSCAN communication bus, the first signal relating to at least one operating condition of the towing vehicle; and
sending a second signal from the brake controller to brakes of the towed vehicle, the second signal based on the first signal; and
wherein the towing vehicle HSCAN communication bus is configured to communicate electronic signals and the towing vehicle HSCAN communication bus interconnects a plurality of components on the towing vehicle and is externally connected to the brake controller.

26. A method for controlling braking of a towed vehicle, the method comprising:
receiving a first signal at a brake controller via a towing vehicle CAN communication bus, the first signal relating to at least one operating condition of the towing vehicle; and
sending a second signal from the brake controller to brakes of the towed vehicle, the second signal based on the first signal; and
wherein the towing vehicle CAN communication bus is configured to communicate electronic signals and the towing vehicle CAN communication bus interconnects a plurality of components on the towing vehicle and is externally connected to the brake controller.

* * * * *